United States Patent
Huang et al.

(10) Patent No.: US 10,467,605 B2
(45) Date of Patent: Nov. 5, 2019

(54) TOLL-FREE DATA MANAGEMENT

(71) Applicant: Verizon Patent and Licensing Inc., Basking Ridge, NJ (US)

(72) Inventors: Jian Huang, Sudbury, MA (US); Susan Kelly, Maynard, MA (US); Chunyan Du, Bedford, MA (US); Jae Won Chung, Lexington, MA (US); Gong Zhang, Waltham, MA (US); Guanrao Chen, Sudbury, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 128 days.

(21) Appl. No.: 15/715,304

(22) Filed: Sep. 26, 2017

(65) Prior Publication Data

US 2019/0095890 A1 Mar. 28, 2019

(51) Int. Cl.
*G06F 15/16* (2006.01)
*G06Q 20/12* (2012.01)
*G06Q 20/14* (2012.01)
*H04M 15/00* (2006.01)
*H04M 15/08* (2006.01)

(52) U.S. Cl.
CPC .......... *G06Q 20/123* (2013.01); *G06Q 20/14* (2013.01); *H04M 15/08* (2013.01); *H04M 15/68* (2013.01); *H04M 15/8083* (2013.01); *H04M 2215/0192* (2013.01)

(58) Field of Classification Search
CPC . G06Q 20/123; G06Q 20/14; H04M 15/8083; H04M 15/08; H04M 15/68; H04M 2215/0192
See application file for complete search history.

(56) References Cited

U.S. PATENT DOCUMENTS

| | | | |
|---|---|---|---|
| 9,402,002 B1* | 7/2016 | Hao | H04M 15/8214 |
| 9,419,851 B1* | 8/2016 | Dyson | H04L 29/08567 |
| 9,489,666 B2 | 11/2016 | Vishwanathan et al. | |
| 2008/0212484 A1* | 9/2008 | Kaminsky | H04L 41/12 370/248 |
| 2012/0278229 A1* | 11/2012 | Vishwanathan | G06Q 20/123 705/40 |

* cited by examiner

*Primary Examiner* — Padma Mundur (57) ABSTRACT

A device can be configured to receive a transmission control protocol (TCP) packet from a user device and determine, based on data included in a header portion of the TCP packet, that the TCP packet includes a toll-free token. The toll-free token included in the TCP packet can be identified, an entity associated with the toll-free token can be identified, and an action can be performed based on the entity.

20 Claims, 5 Drawing Sheets

TOLL-FREE DATA MANAGEMENT

BACKGROUND

Content providers, such as online media companies, might wish to deliver content to network users. Some content providers can choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings can identify the same or similar elements.

A content provider can provide content (e.g., streaming video and/or audio content, a webpage, a document, an image, and/or the like) to a network user. In some situations, the content provider might want to sponsor, or subsidize, the cost of network data usage associated with the content, which would ordinarily be charged to an account of the network user. A network operator can ensure that network data usage is charged to an account of the appropriate entity (e.g., either the content provider or the network user). One way to ensure appropriate charges is to use a toll-free token, or identifier, that can be included in a transmission control protocol (TCP) network packet sent to the network operator; the toll-free token can be used to identify an entity to be charged for data usage incurred during a TCP session associated with the TCP network packet. In this way, a network device can identify network data usage associated with an entity, enabling the network operator to associate network data usage with the appropriate entity.

Some implementations, described herein, provide a toll-free data device (TFDD) to inspect a TCP packet sent from a user device to a content server and identify, using a toll-free token included in the TCP packet, an entity to be charged for data transferred using a corresponding TCP connection. For example, the TFDD can receive a TCP synchronize (SYN) packet from a user device that is attempting to establish a TCP connection with a content server. The TFDD can inspect the TCP SYN packet to identify a toll-free token (e.g., in a data portion and/or in a header field of the TCP packet). The toll-free token can be used to determine that an account associated with the user device should not be charged for data transmitted using a TCP connection associated with the TCP SYN packet. The TFDD can also use toll-free token to identify an account that belongs to an entity to be charged for the data transmitted using the TCP connection, such as the entity responsible for the content server. In some implementations, the TFDD, and/or other devices of the network provider, can monitor the amount of data transmitted between the user device and content server and provide a log or account of the data usage to an accounting device (e.g., in a manner designed to ensure the appropriate entity is charged for the data usage).

Some implementations described herein can provide an enhanced user experience for users of user devices and entities providing content for users. Some implementations can also enhance a network provider's experience (e.g., by enabling providers to offer a toll-free data service to users and content providers). User experience can be enhanced, for example, by enabling users to experience content available over a network without incurring data charges, which can allow users to save their data and/or other resources. For content providers, the ability to sponsor, or subsidize, users' data when those users are experiencing the content provider's content can improve the service that the content provider provides to its users. Improving service can also facilitate the content provider's ability to reach more users and/or to provide more content to existing users, providing an enhanced user experience when users experience the content provider's content. In some implementations, using TCP packets to provide toll-free tokens at the beginning of a TCP session can allow a network provider to offer a toll-free data service that can work without using a proxy server and in a manner that can be used to make secure network traffic (e.g., hyper-text transfer protocol secure (HTTPS)) toll-free.

Figure 1:
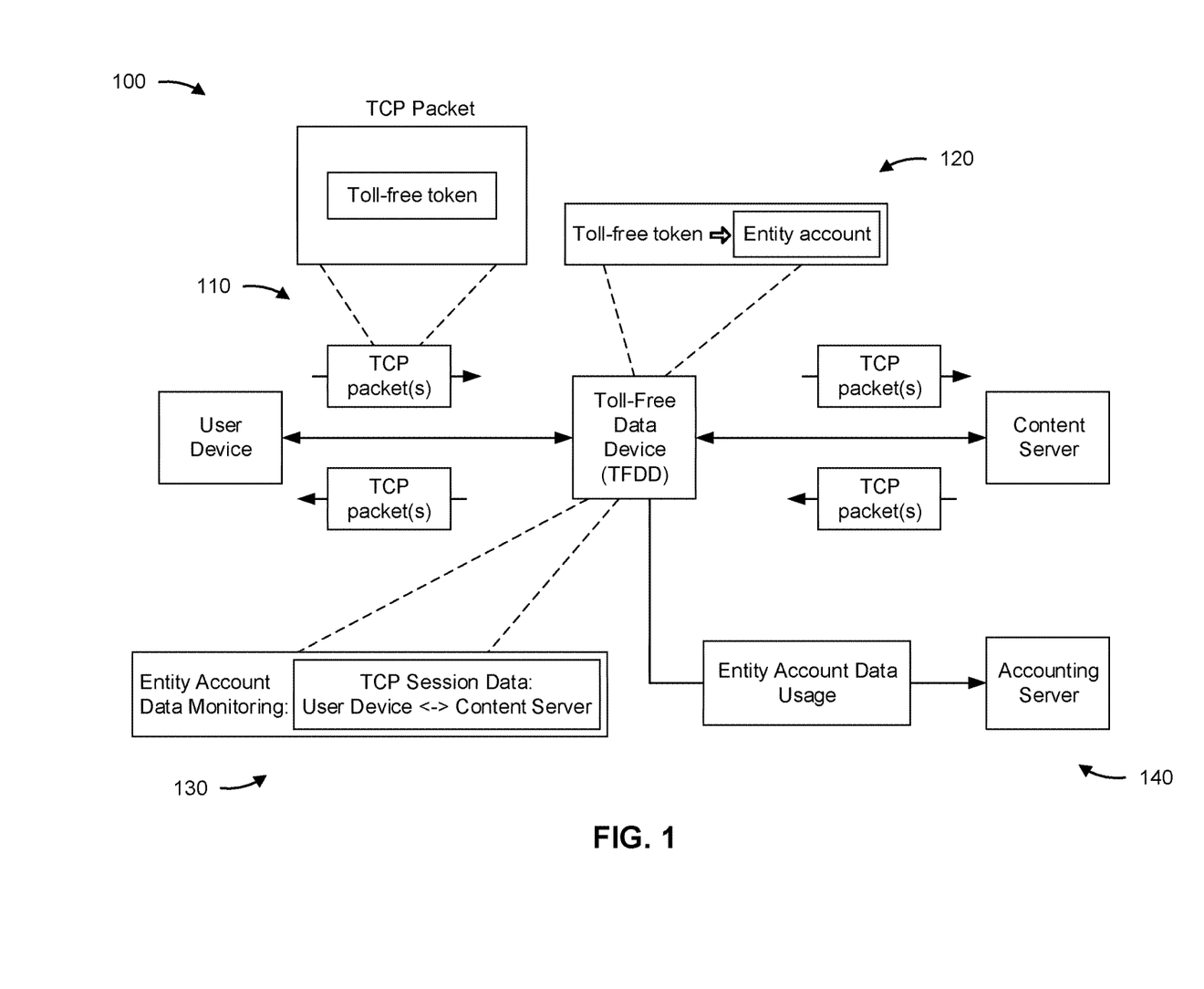
FIG. 1 is a diagram of an overview of an example implementation described herein.

FIG. 1 is a diagram of an overview of an example implementation 100 described herein. As shown in FIG. 1, example implementation can include a user device, a toll-free data device (TFDD), a content server, and an accounting server. The TFDD and/or accounting server can be included in a network, such as an Internet service provider's network, which is used to facilitate communications between the user device and the content server.

As shown in FIG. 1, and by reference number 110, a user device can send a TCP packet to the content server by going through a network that includes the TFDD. The TCP packet can be, for example, part of a three-way handshake for establishing a TCP connection between the user device and the content server. An example three-way handshake can include a TCP SYN packet sent by the user device to the content server, a TCP synchronize/acknowledge (SYN/ACK) packet sent from the content server to the user device, and a TCP ACK packet sent from the user device to the content server. The TCP connection resulting from a successful three-way handshake can, for example, provide host-to-host connectivity between the user device and content server at the transport layer of the Internet model.

In the example implementation 100, a TCP packet sent by the user device includes a toll-free token. The toll-free token can include data, such as a string of characters, which can be used to identify a toll-free account. The toll-free token can be included in the TCP packet in a variety of ways. For example, the toll-free token can be included in the data offset portion of the TCP header, the options portion of the TCP header, and/or the data portion of the TCP packet. In some implementations, the TFDD can intercept a TCP packet that includes a toll-free data token and remove the token from the TCP packet before the TCP packet is forwarded to the content server.

As further shown in FIG. 1, and by reference number 120, the TFDD identifies an entity account associated with the toll-free token. The entity account can be an account associated with the entity sponsoring, or subsidizing, the data (e.g., an organization that offers to pay for data usage that occurs using a connection established using the TCP packet). In some implementations, the toll-free token can include the entity account name and/or number (e.g., the toll-free token can include a string of numbers that includes an account number of an entity). In some implementations, the toll-free token can include data used to identify an entity account (e.g., the toll-free token can include a string of characters that can refer to an entity account number, such as an entity account number included in a database and referenced by the string of characters included in the toll-free token).

As further shown in FIG. 1, and by reference number 130, the TFDD monitors TCP session data between the user device and the content server. For example, the TFDD can store socket data (e.g., TCP socket data specifying source address, source socket, destination address, and destination socket) for the TCP connection, or session, between the user device and the content server. When data is transmitted between the user device and the content server using the TCP connection, the TFDD can monitor the data usage (e.g., byte count, packet count, and/or the like) by using the TCP socket data to identify data packets associated with the connection between the user device and the content server. As data is transferred between the user device and the content server during the TCP session using the TCP connection, the TFDD can record the data usage.

As further shown in FIG. 1, and by reference number 140, the TFDD provides the accounting server with data specifying the data usage to be associated with the entity account (e.g., the data transmitted between the user device and the content server during the TCP session associated with the TCP connection). The accounting server can use the entity account data usage, for example, to bill the entity account. In this way, the TFDD can monitor and report data usage associated with a TCP session that was established using a TCP packet that included a toll-free token associated with an entity, e.g., to enable that entity to assume responsibility for the data usage.

Accordingly, example implementation 100 depicts a TFDD that can provide a toll-free data service capable of being established at various points in time during a TCP session, including at the beginning of a TCP session (e.g., during the three-way handshake). In addition, the toll-free data service provided by a TFDD can obviate the use of a proxy server for tracking toll-free data, and in some implementations the toll-free data service can track toll-free data even over secure connections, like HTTPS, as the TFDD can track data usage using TCP header data without the need to access secured communications.

In some implementations, a TFDD can provide, for users of user devices, an enhanced user experience. For example, users can be enabled to experience content without incurring data charges to their own user accounts, allowing users to allocate their data usage for other uses. In addition, users can be enabled to experience content that they might have not otherwise been able to experience (e.g., due to costs associated with user data usage, which can be alleviated by using a toll-free data sponsor). Content providers can provide their own content to users without those users being responsible for data charges. This can facilitate content providers' desire to reach more users that might not otherwise be able to experience the content provided by the content providers. Additionally, content providers' can provide users with an enhanced experience including enabling users to experience content without incurring data charges for the user, which might facilitate an increase in the consumption of the content providers' content.

As indicated above, FIG. 1 is provided merely as an example. Other examples are possible and can differ from what was described with regard to FIG. 1.

Figure 2:
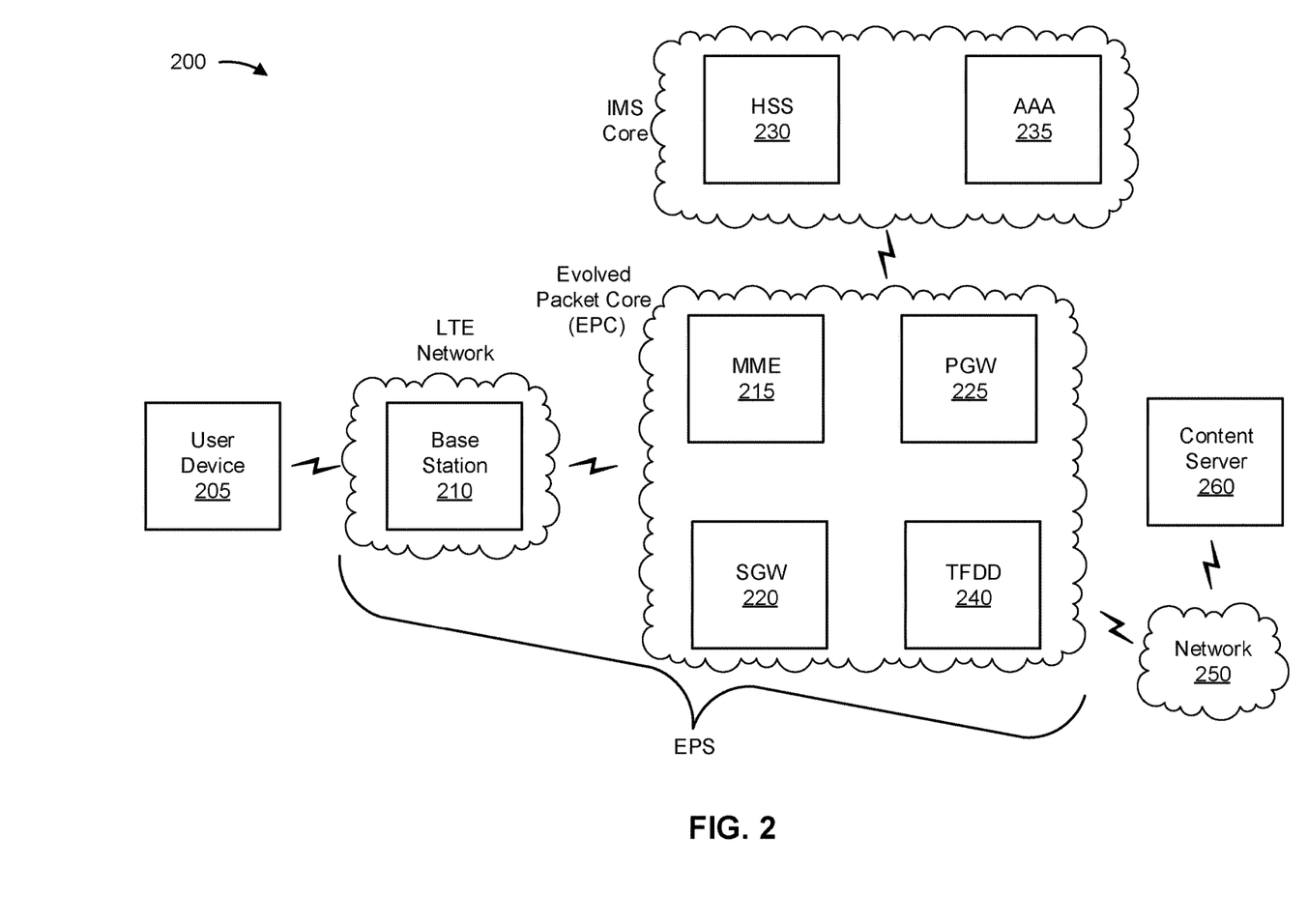
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a TFDD 240; a network 250; and a content server 260. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 includes an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, PGW 225, and/or TFDD 240 that enable user device 205 to communicate with network 250 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 includes one or more devices capable of communicating with base station 210 and/or a network (e.g., network 250). User device 205 can include one or more devices capable of receiving, generating, storing, processing, and/or providing information associated with a toll-free data service. For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. In some implementations, user device 205 can be associated with an account that is adjusted based on network data usage by user device 205. User device 205 can send traffic to and/or receive traffic from network 250 (e.g., via base station 210, SGW 220, PGW 225, and/or TFDD 240).

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. SGW 220 can also receive traffic from network 250 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to user device 205 via SGW 220 and base station 210. PGW 225 can record data usage information (e.g., byte usage), and can provide the data usage information to AAA 235.

HSS 230 includes one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with user device 205. In some implementations, AAA 235 can store and/or provide data usage information associated with entity accounts, including accounts for a user of user device 205 and/or for entity accounts associated with entities who sponsor toll-free data. Additionally, or alternatively, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

TFDD 240 includes one or more devices capable of receiving, processing, storing, generating, and/or providing information associated with a toll-free data service. For example, TFDD 240 can include a server device (e.g., a host server, a web server, an application server, etc.), a cloud computing device, or a similar device. In some implementations, TFDD 240 can be capable of receiving, from user device 205, one or more TCP packets that include a toll-free token. TFDD 240 can be in communication with a data storage device for storing relationships between toll-free tokens and entity accounts associated with entities sponsoring toll-free data. Additionally, or alternatively, TFDD 240 can monitor information associated with a TCP session between user device 205 and content server 260. In some implementations, TFDD 240 can communicate data usage information and/or entity account information for a toll-free data session to another device, such as AAA 235.

Network 250 includes one or more wired and/or wireless networks. For example, network 250 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Content Server 260 includes one or more devices capable of providing content, such as one or more web pages, images, videos, audio files, documents, application data, and/or the like. For example, content server 260 can include a server device (e.g., a host server, a web server, an application server, etc.), a cloud computing device, or a similar device. Content server 260 can communicate with user device 205 (e.g., via network 250 and/or the EPS) using TCP/IP and/or other protocols, such as hyper-text transfer protocol (HTTP), domain name system (DNS), file transfer protocol (FTP), dynamic host configuration protocol (DHCP), internet message access protocol (IMAP), secure shell (SSH), simple mail transfer protocol (SMTP), and/or the like.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
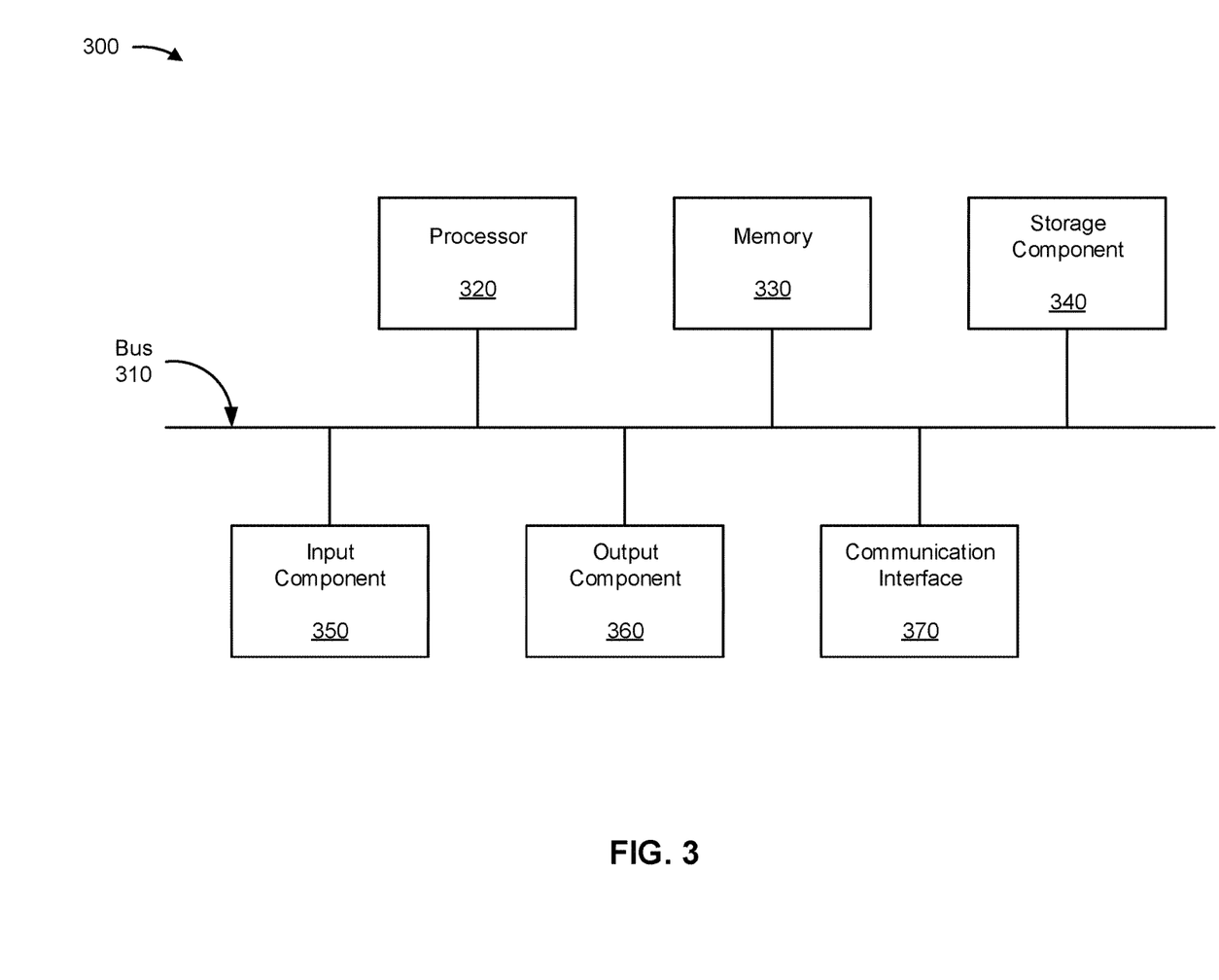
FIG. 3 is a diagram of example components of one or more devices of FIG. 2.

FIG. 3 is a diagram of example components of a device 300. Device 300 can correspond to a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a TFDD 240; and/or a content server 260. In some implementations, a user device 205; and/or a base station 210; and/or a mobility management entity device (MME) 215; and/or a serving gateway (SGW) 220; and/or a packet data network gateway (PGW) 225; and/or a home subscriber server (HSS) 230; and/or an authentication, authorization, and/or accounting server (AAA) 235; and/or a TFDD 240; and/or a content server 260; can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
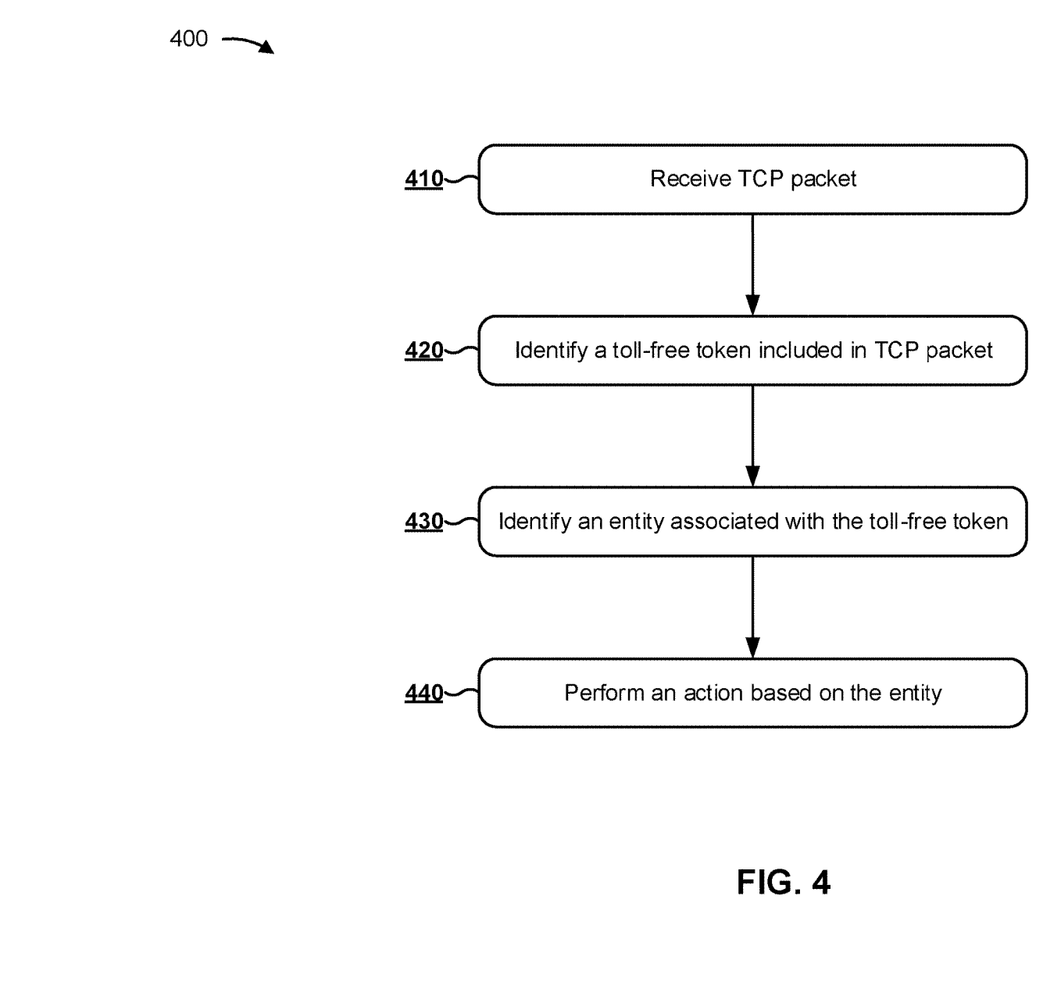
FIG. 4 is a flow chart of an example process for toll-free data management.

FIG. 4 is a flow chart of an example process 400 for process for toll-free data management. In some implementations, one or more process blocks of FIG. 4 can be performed by TFDD 240. In some implementations, one or more process blocks of FIG. 4 can be performed by another device or a group of devices separate from or including TFDD 240, such as a user device 205, a base station 210, an MME 215, an SGW 220, a HSS 230, an AAA 235, and/or a content server 260.

As shown in FIG. 4, process 400 can include receiving TCP packet (block 410). For example, TFDD 240 can receive, from user device 205, a TCP packet. The TCP packet might have been sent, for example, by user device 205 and destined for a destination device, such as content server 260. In some implementations, the TCP packet can be part of a three-way handshake for establishing a TCP connection between user device 205 and content server 260. For example, the TCP packet can be a TCP SYN packet sent by user device 205 to establish a TCP connection with content server 260 (e.g., to enable user device 205 to receive content from content provider 260, such as a web page, image, video, and/or the like).

In some implementations, TFDD 240 receives the TCP packet as a part of the process to facilitate communication between user device 205 and content server 260. For example TFDD 240 can be included in a network service provider's back end network, such as an EPC network. TFDD 240 might be responsible for performing a variety of actions, including receiving TCP/IP network packets, identifying destinations for the TCP/IP network packets from TCP header data, and forwarding the TCP/IP network packets to their intended destinations.

In this way, TFDD 240 can receive a TCP packet, enabling TFDD 240 to identify a toll-free token included in the TCP packet.

As further shown in FIG. 4, process 400 can include identifying a toll-free token included in TCP packet (block 420). For example, TFDD 240 can inspect the TCP packet to identify the toll-free token. In some implementations, the toll-free token was included in the TCP packet by user device 205 and/or an application operating on user device 205. For example, an application of user device 205 can cause a toll-free token to be inserted into a TCP packet. The form of the toll-free token, and/or the manner in which the toll-free token is inserted into the TCP packet, can vary (e.g., based on the application and/or the contents of the TCP packet into which the toll-free token is inserted). The manner in which the toll-free token is identified by TFDD 240 can, in some implementations, be based on the manner in which the toll-free token was inserted into the TCP packet.

TFDD 240 can identify a toll-free token in a variety of ways. Toll-free tokens can, for example, have one or more predetermined features identifying the toll-free tokens as a toll-free token. One example feature can include a predetermined set of one or more characters, or character types, that indicates which characters are included in the toll-free token. For example, it can be predetermined that a toll-free token is a fixed length string that begins with the same set of characters as each other toll-free token. As another example, it can be predetermined that a toll-free token includes a string of characters that follows a specific pattern of character types, such as a specific combination of letters, numbers, punctuation marks, symbols, and/or the like. Additionally, or alternatively, a predetermined feature can include a flag or piece of data indicating that another piece of data includes the toll-free token. For example, a portion of the TCP packet can include a string having a predetermined form, and the string can specify a location, or offset, within the TCP packet (e.g., specifying the location or offset where the toll-free token is located). Another example feature that TFDD 240 can use to identify a toll-free token can include the portion of the TCP packet in which the toll-free token is stored. For example, a toll-free token can be stored in a particular portion of the TCP packet, and TFDD 240 can inspect the particular portion of the TCP packet to identify the toll-free token.

The toll free token can be included in the TCP packet in a variety of ways. For example, the toll-free token can be included in one or more fields of the TCP packet header, in the body of the TCP packet, and/or a combination of one or more fields of the TCP packet header and the body of the TCP packet.

By way of example, a toll-free token can be included in the options field of the TCP packet header. In some implementations, the options field of the TCP packet can include up to 40 bytes of data, and a toll-free token can be a string of characters, up to 40 bytes in length, that is included in the options field. In some implementations, the TCP packet can include a data offset field that specifies the size of the TCP header, which can also be the start of TCP data in situations where the TCP packet includes data in addition to the header. In an example situation, a data offset of 5 words, or 20 bytes, indicates that the TCP packet header has no options (e.g., because the minimum TCP header size, with no options, is 5 words). In this example, when data is included in the options field, and the data offset indicates there are no options, TFDD 240 can use this information to determine that data included in the options field of the TCP packet is a toll-free token (e.g., rather than standard TCP option data). In another example, the TCP packet can include both standard TCP option data and the toll-free token. For example, a data offset of 7 words can indicate that 2 words of TCP options are included in the TCP options field. TFDD 240 can, based on the foregoing, determine that additional data included in the TCP options field is a toll-free token.

In some implementations, a toll-free token can be included in the body of the TCP packet. For example, the body of the TCP packet can include a string of characters that includes the toll-free token. The toll-free token can be included in the body of the TCP packet by itself or with other data.

In some implementations, data included in the TCP packet can specify, for the TFDD 240, a location of the toll-free token. For example, TFDD 240 can determine that a toll-free token is included in the TCP packet body based on a predetermined flag or string included in the options portion of the TCP packet header. In some implementations, data included in the TCP packet can specify a different TCP packet as a location of the toll-free token. For example, a first TCP packet can include a string of characters that specifies, for the TFDD 240, that a toll-free token is to be included in a second TCP packet (e.g., by specifying a packet identifier, such as a TCP packet sequence number, of a TCP packet that will include the toll-free token).

In some implementations, TFDD 240 can identify the toll-free token from multiple TCP packets. For example, a first portion of the toll-free token can be included in a first TCP packet, and a second portion of the toll-free token can be included in a second TCP packet.

While various implementations and examples for identifying a toll-free token included in a TCP packet are presented above, in some implementations, more than one of the foregoing identification methods and/or other methods of identifying a toll-free token in a TCP packet can be used. The variety of ways in which a toll-free token can be identified in a TCP packet can permit flexibility in providing toll-free tokens. As the contents of TCP packets can vary, the manner in which a toll-free token can be identified from a TCP packet can also vary, e.g., in a manner designed to permit toll-free tokens to be included in and identified in a variety of different TCP packets with varying content. In this way, TFDD 240 can identify a toll-free token included in the TCP packet, enabling TFDD 240 to identify an entity associated with the toll-free token.

As further shown in FIG. 4, process 400 can include identifying an entity associated with the toll-free token (block 430). For example, TFDD 240 can identify an entity based on the toll-free token. An entity can be, for example, an organization or individual associated with the toll-free token, such as a content providing company that uses a toll-free token (e.g., in a manner designed to allow users to experience content provided by the company without the users being responsible for the data consumption or charges). TFDD 240 can use the toll-free token to identify an entity, for example, by using the toll-free token to look up the entity in a table or database or querying a storage device using the toll-free token.

In some implementations, an entity might have been previously associated with a toll-free token by registering for, applying for, requesting, or otherwise providing an indication that the entity should be associated with a toll-free token. For example, a content provider can request a toll-free token from a network provider. The request can be handled by TFDD 240, or another device associated with the network provider, by acquiring or generating a toll-free token and associating the toll-free token with the content provider in a database.

In some implementations, an entity account can be identified based on a toll-free token. For example, a toll-free token can be an entity account identifier that identifies a network provider account of the entity associated with the toll-free token. The entity account can be, for example, an account that the entity previously registered with the network provider (e.g., in a manner designed to provide an account that can be charged for data usage associated with the network provider's network).

In some implementations, an entity can be associated with multiple toll-free tokens. For example, an entity can have multiple toll-free tokens, and the toll-free tokens can differ in a variety of ways. For example, different toll-free tokens can be associated with different entity accounts, in a manner designed to enable entities to have separate accounts charged for data usage based on the toll-free token used. In some implementations, an entity can use different toll-free tokens to separately track toll-free token usage. For example, a first toll-free token associated with an entity can be associated with a first set of content provided by that entity. A second toll-free token can be associated with a second set of content provided by that entity, while the second toll-free token is associated with the same entity and the same entity account. This can enable, for example, an entity to track toll-free data usage separately for the first and second sets of content. In some implementations, TFDD 240 or other devices associated with a network provider's network, can track toll-free token usage information on behalf of an entity.

In this way, TFDD 240 can identify an entity associated with the toll-free token, enabling TFDD 240 to perform an action based on the entity.

As further shown in FIG. 4, process 400 can include performing an action based on the entity (block 440). For example, TFDD 240 can perform an action based on the entity associated with the toll-free token. Potential action(s) performed by TFDD 240 can vary, and can include, for example, action(s) affecting the TCP packet received by TFDD 240, action(s) affecting the entity (including an entity account associated with the entity), action(s) affecting user device 205 (including one or more applications operating on user device 205), action(s) affecting a third party entity or device, and/or action(s) associated with a TCP session between user device 205 and content server 260.

In some implementations, TFDD 240 can forward the TCP packet to content server 260. For example, after identifying an entity associated with the toll-free token included in the TCP packet, TFDD 240 can forward the TCP packet to its intended destination. In some implementations, forwarding the TCP packet can facilitate communications between user device 205 and content server 260, such as facilitating the establishment of a TCP session between user device 205 and content server 260. For example, in a situation where the toll-free token is included in a TCP packet that is part of the three-way handshake for establishing the TCP session, forwarding the TCP packet can enable user device 205 and content server 260 to establish the TCP session.

In some implementations, TFDD 240 forwards the TCP packet to content server 260 without the toll-free token. For example, TFDD 240 can remove the toll-free token from the TCP packet before the TCP packet is sent to content server 260. As another example, TFDD 240 can rebuild the TCP packet without the toll-free token and/or data that refers to the toll-free token. The toll-free token can be removed from the TCP packet, or the TCP packet rebuilt without the toll-free token, in manner designed to obviate transmitting data that might not be useful for content server 260.

In some implementations, TFDD 240 can monitor TCP session data based on the entity. For example, based on identifying an entity associated with the toll-free token, TFDD 240 can determine to monitor the TCP session between user device 205 and content provider 260. TFDD 240 can monitor the TCP session, for example, by storing a TCP socket address (e.g., a combination of IP address and port number) for user device 205 and content server 260. TFDD 240 can identify TCP packets that are included in the TCP session between user device 205 and content provider 260 by inspecting TCP packets and identifying the TCP socket address included in TCP packets sent between user device 205 and content provider 260. Data regarding the data transmitted during the TCP session can be stored by TFDD 240, e.g., in a local or remote storage device.

In some implementations, TFDD 240 can send a notification based on the entity associated with the toll-free token. For example, TFDD 240 can send a notification to user device 205, content provider 260, a device associated with the entity associated with the toll-free token, a device associated with network provider's network (e.g., AAA 235), and/or a device associated with a third party. By way of example, TFDD 240 can, based on identifying the entity associated with the toll-free token, send a notification to a device associated with the entity, the notification informing the entity of the toll-free token's use. As another example, TFDD 240 can, based on identifying the entity associated with the toll-free token, send a notification to user device 205, the notification indicating to an application of user device 205 that the content provided by content server 260 is sponsored by, or provided toll-free by, the entity associated with the toll-free token. As yet another example, TFDD 240 can provide a notification to AAA 235, the notification including data that causes AAA 235 to use the data to charge, credit, or otherwise adjust one or more accounts associated with data charges for communications between user device 205 and content server 260 (e.g., a notification can cause AAA 235 to forego charging user device 205 for data transmitted during the TCP session between user device 205 and content provider 260).

In some implementations, TFDD 240 can cause one or more accounts to be adjusted based on the entity associated with the toll-free token. For example, TFDD 240 can cause an adjustment to an account associated with user device 205 and/or to an account associated with the entity. In some implementations, TFDD 240 can provide an accounting device of the network provider, such as AAA 235, with data that causes the accounting device to adjust an account. By way of example, TFDD 240 can monitor and record the amount of data being transferred using a TCP connection between user device 205 and content server 260; data identifying the entity associated with the toll-free token, and the amount of data transferred between user device 205 and content server 260, can be sent to the AAA 235 (e.g., periodically, at the conclusion of the TCP session, and/or at predetermined data thresholds), enabling AAA 235 to identify an entity account associated with the entity and the entity account based on the amount of data transferred during the TCP session between user device 205 and content server 260.

In this way, TFDD 240 can perform an action based on the entity, enabling a variety of functions that facilitate toll-free data management for a network. The ability to perform actions, such as those described above, can enable a network provider to provide a valuable service for its users, including users enabled to experience content toll-free and users enabled to assume responsibility for data usage associated with providing particular content.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
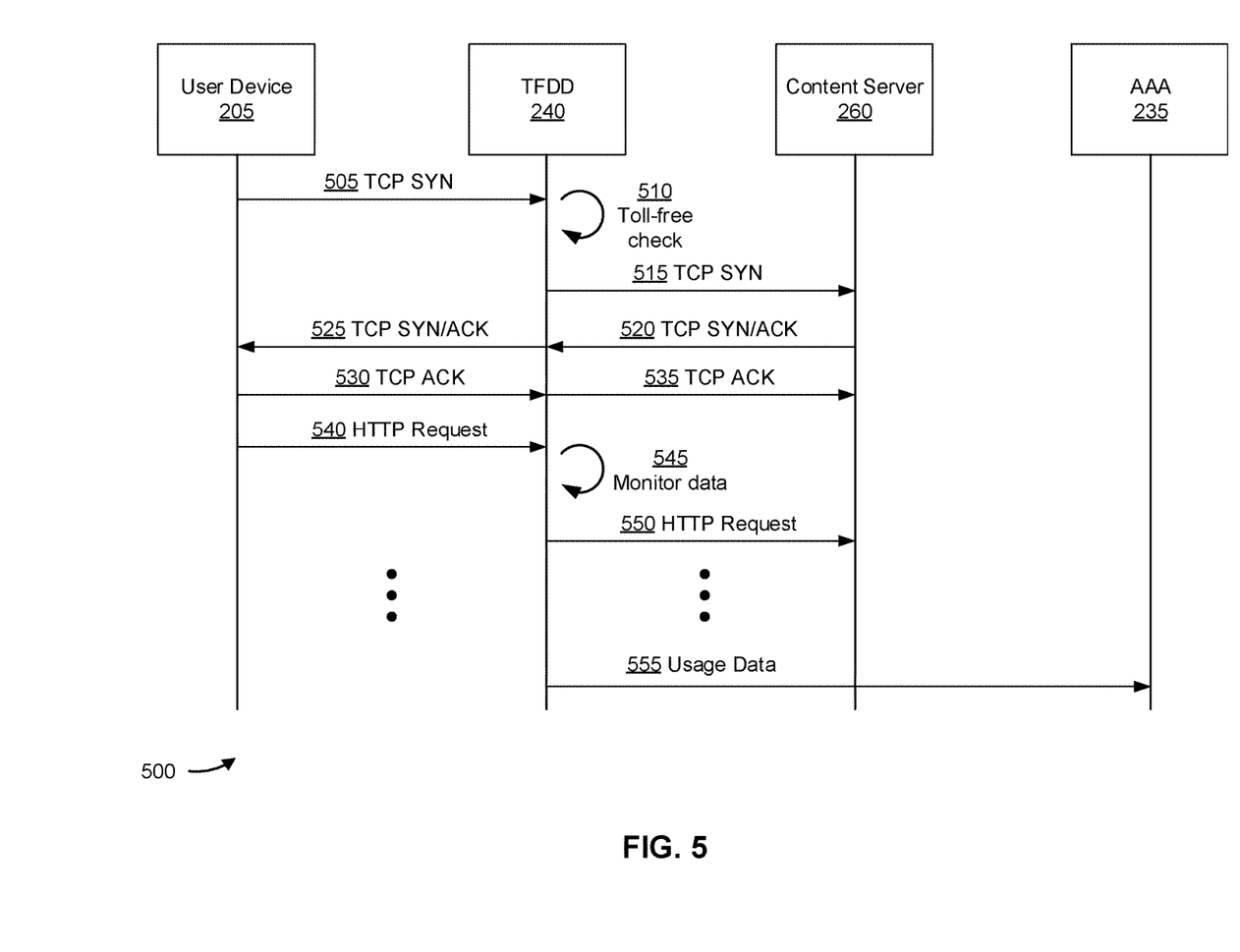
FIG. 5 is a diagram of an example implementation relating to the example process shown in FIG. 4.

FIG. 5 is a call flow diagram of an example call flow 500 for managing toll-free data. FIG. 5 shows an example of toll-free data management for a TCP session involving user device 205, TFDD 240, and content server 260.

As shown in FIG. 5, and by reference number 505, user device 205 sends a TCP SYN packet to TFDD 240. The TCP SYN packet can be, for example, a TCP packet that includes a TCP SYN message and is addressed to content server 260. The TCP SYN packet can be sent as the first part of a three-way handshake to establish a TCP session between user device 205 and content server 260.

As shown by reference number 510, TFDD 240 performs a toll-free check by inspecting the TCP SYN packet for a toll-free token. For example, TFDD 240 can check the data offset portion of the TCP packet header to determine there are no options included in the TCP packet header. Based on this determination, TFDD 240 can determine that data included in the options portion of the TCP header includes a toll-free token. The toll-free check 510 can include a variety of actions, including the identifying an entity associated with the toll-free token, removing the toll-free token from the TCP SYN packet, forwarding the TCP SYN packet, notifying an entity associated with the toll-free token of the toll-free token's use, recording TCP socket data for monitoring network traffic using a TCP session to be established between user device 205 and content server 260, and/or the like.

As shown by reference number 515, TFDD 240 provides the TCP SYN packet to content server 260. The TCP SYN packet can be sent with or without the toll-free token. As shown by reference number 520, the content server 260 responds to the TCP SYN packet with a TCP SYN/ACK packet, acknowledging the TCP SYN packet sent by user device and notifying user device 205 of TCP packet synchronization information.

As shown by reference number 525, TFDD 240 provides the TCP SYN/ACK packet to user device 205. To finish the three-way handshake and establish an open TCP session, and as shown by reference number 530, user device 205 provides a TCP ACK packet to TFDD 240, acknowledging receipt of the TCP SYN message provided by content server 260. As shown by reference number 535, TFDD 240 forwards the TCP ACK packet to content server 260, concluding the three-way handshake and establishing a TCP session between user device 205 and content server 260.

As shown by reference number 540, TFDD 240 receives an HTTP request from user device 205. The HTTP request can be included in an IP datagram having a TCP header that includes TCP socket data (e.g., IP address and port numbers for the open TCP session between user device 205 and content server 260).

As shown by reference number 545, TFDD 240 monitors data usage, including identifying network packets being transferred during the TCP session established between user device 205 and content server 260. TFDD 240 can determine which network packets to monitor, for example, by inspecting TCP headers for TCP socket data that matches socket data of TCP session that was previously recorded by TFDD 240. In some implementations, TFDD 240 can track the amount of data transferred between user device 205 and content server 260 by inspecting network packets transferred during the TCP session to determine their size.

As shown by reference number 550, TFDD 240 provides the HTTP request to content server 260. For example, after recording the size of the HTTP request, TFDD 240 can provide the HTTP to the content server 260. TFDD 240 can, in some implementations, continue monitoring data usage by inspecting network packets as they are sent and/or received using the TCP session between user device 205 and content server 260.

As shown by reference number 555, TFDD 240 provides usage data to AAA 235. Usage data can include, for example, the toll-free token, an entity associated with the toll-free token, an entity account identifier associated with the toll-free token, an amount of data usage monitored for a TCP session between user device 205 and content server 260, and/or the like. Usage data can be sent, by way of example, periodically and/or based on predetermined events, such as when a threshold amount of data is transferred, when a network packet is forwarded by TFDD 240, and/or when the TCP session between user device 205 and content server 260 ends.

As indicated above, FIG. 5 is provided as merely an example. Other examples are possible and can differ from what was described with regard to FIG. 5. For example, the order in which the steps of call flow 500 occur can differ (e.g., toll-free check 510, data monitoring 545, and usage data reporting 555 can occur at additional and/or different points of call flow 500.

Some implementations of TFDD 240 described herein can provide an enhanced user experience for users of user devices and for entities providing content for users. For example, the toll-free data management operations of TFDD 240 can facilitate providing users with network content without incurring data usage charges for experiencing that network content. This can lead to users experiencing more content, and/or to more users experiencing toll-free content that might not have experienced the content were the content not toll-free. The toll-free data management operations of TFDD 240 can also facilitate providing content providers with a way to reach more users and/or to provide more content to existing users (e.g., by enabling content providers to sponsor their content as toll-free and/or to find sponsors to provide toll-free tokens for the content provider's content.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a transmission control protocol (TCP) packet from a user device,
the TCP packet being a TCP synchronize packet addressed to a content server;
inspect a data offset portion of a header portion of the TCP packet;
determine, based on first data included in the data offset portion of the header portion of the TCP packet, that the TCP packet does not include TCP option data in an options portion of the header portion of the TCP packet;
inspect, based on determining that the TCP packet does not include TCP option data in the options portion of the header portion of the TCP packet, the options portion of the header portion of the TCP packet;
determine, based on the options portion of the header portion of the TCP packet including second data, that the second data includes data identifying a toll-free token;
identify, based on the second data included in the options portion of the header portion of the TCP packet, the toll-free token;
identify an entity associated with the toll-free token; and
perform an action based on the entity.

2. The device of claim 1, where the one or more processors are further to:
forward the TCP packet to a destination device specified by data included in the TCP packet.

3. The device of claim 1, where the one or more processors are further to:
remove the toll-free token from the TCP packet; and
forward the TCP packet to a destination device specified by data included in the TCP packet.

4. The device of claim 1, where the one or more processors, when performing the action based on the entity, are to:
identify an entity account associated with the entity; and
monitor an amount of data transferred between the user device and a destination device specified by the TCP packet.

5. The device of claim 4, where the one or more processors, when monitoring the amount of data transferred between the user device and the destination device specified by the TCP packet, are to:
identify a TCP session based on TCP socket data included in the TCP packet; and
inspect network packets that are communicated between the user device and the destination device using the TCP session.

6. The device of claim 4, where the one or more processors, when performing the action based on the entity, are to:
provide an accounting device with data indicating:
the entity account, and
the amount of data transferred between the user device and the destination device.

7. The device of claim 1, where the data identifying the toll-free token includes a predetermined string of characters.

8. The device of claim 1, where the data identifying the toll-free token indicates that the toll-free token is included in another TCP packet.

9. A non-transitory computer-readable medium storing instructions, the instructions comprising:
one or more instructions that, when executed by one or more processors, cause the one or more processors to:
receive a transmission control protocol (TCP) packet from a user device,
the TCP packet being a TCP synchronize packet addressed to a content server;
inspect a data offset portion of a header portion of the TCP packet;
determine, based on first data included in the data offset portion of the header portion of the TCP packet, that the TCP packet does not include TCP option data in an options portion of the header portion of the TCP packet;
inspect, based on determining that the TCP packet does not include TCP option data in the options portion of the header portion of the TCP packet, the options portion of the header portion of the TCP packet;

determine, based on the options portion of the header portion of the TCP packet including second data, that the second data includes data identifying a toll-free token;

identify, based on the second data included in the options portion of the header portion of TCP packet, the toll-free token;

identify an entity associated with the toll-free token; and perform an action based on the entity.

10. The non-transitory computer-readable medium of claim 9, where:

the data identifying the toll-free token specifies that the toll-free token is included in a data portion of the TCP packet.

11. The non-transitory computer-readable medium of claim 9, where:

the toll-free token is included in the options portion of the header portion of the TCP packet.

12. The non-transitory computer-readable medium of claim 9, where the data identifying the toll-free token includes a predetermined string of characters.

13. The non-transitory computer-readable medium of claim 9, where the data identifying the toll-free token indicates that the toll-free token is included in another TCP packet.

14. The non-transitory computer-readable medium of claim 9, where the data identifying the toll-free token indicates that a first portion of the toll-free token is included in the TCP packet and a second portion of the toll-free token is included in another TCP packet.

15. A method, comprising:

receiving, by a device, a transmission control protocol (TCP) packet from a user device, the TCP packet being a TCP synchronize packet addressed to a content server;

inspecting, by the device, a data offset portion of a header portion of the TCP packet determining, by the device and based on first data included in the data offset portion of the header portion of the TCP packet, that the TCP packet does not include TCP option data in an options portion of the header portion of the TCP packet;

inspecting, by the device and based on determining that the TCP packet does not include TCP option data in the options portion of the header portion of the TCP packet, the options portion of the header portion of the TCP packet;

determining, by the device and based on the options portion of the header portion of the TCP packet including second data, that the second data includes data identifying a toll-free token;

identifying, by the device and based on the second data included in the options portion of the header portion of the TCP packet, the toll-free token;

identifying, by the device, an entity associated with the toll-free token; and performing, by the device, an action based on the entity.

16. The method of claim 15, further comprising:

identifying, based on data included in the TCP packet, data identifying a TCP session between the user device and the content server; and monitoring data transferred using the TCP session.

17. The method of claim 16, where performing the action based on the entity comprises:

storing a record of the monitored data, the record being associated with the entity.

18. The method of claim 16, where performing the action based on the entity comprises:

providing an accounting device with:

data specifying the entity; and data specifying an amount of data transferred during the TCP session.

19. The method of claim 15, where performing the action based on the entity comprises:

providing, to an entity device associated with the entity, data indicating that the toll-free token is in use.

20. The method of claim 15, where performing the action based on the entity comprises:

providing an accounting device with:

data identifying a user account associated with the user device; and data indicating that the toll-free token is in use.

* * * * *